United States Patent [19]

Kirchgessner

[11] Patent Number: 4,927,987
[45] Date of Patent: May 22, 1990

[54] DIRECTIONAL CONTROL DEVICE

[76] Inventor: Steven J. Kirchgessner, 7845 Greenbriar Rd., Talbot, Tenn. 37877

[21] Appl. No.: 315,522

[22] Filed: Feb. 24, 1989

[51] Int. Cl.⁵ .............................................. H01H 9/00
[52] U.S. Cl. ................................. 200/5 R; 200/52 R
[58] Field of Search .............. 200/5 R, 5 A, 6 R, 6 A, 200/17 R, 52 R, DIG. 2; 235/145 R; 341/20–23; 340/706–712; 273/148 B

[56] References Cited

U.S. PATENT DOCUMENTS

| | | | |
|---|---|---|---|
| 3,950,634 | 4/1976 | Speiser | 235/145 R |
| 4,005,388 | 1/1977 | Morley et al. | 341/23 X |
| 4,065,650 | 12/1977 | Lou | 200/5 R |
| 4,473,724 | 9/1984 | Suzuki | 200/5 R |
| 4,584,443 | 4/1986 | Yaeger | 200/5 R X |

OTHER PUBLICATIONS

D. C. Kowalski; "Semi-Captive Keyboard"; Xerox Disclosure Journal; vol. 1; No. 2; Feb. 1976, p. 85.

*Primary Examiner*—J. R. Scott
*Attorney, Agent, or Firm*—Luedeka, Hodges & Neely

[57] ABSTRACT

A hand-held control device for use in controlling directional characteristics in apparatus, such as the direction of movement of video display images in electronic game machines, includes a body having an opening and four depressible switches regularly spaced about the opening. The opening is sized to receive the finger of a user inserted endwise therein, and the switches are disposed adjacent the sides of the opening so that each of the switches can be actuated with the side of the user's finger when the user's finger is received by and moved toward a corresponding side of the opening. When the device is in use, each switch is responsible for initiating a directional control signal corresponding to an X or Y coordinate direction in an X-Y plane. Fifth and sixth switches are mounted in the body for actuation by the thumb and index finger of the hand which holds the device and are responsible for control signals, such as "fire" or "jump" signals, which are independent of the directional control signals.

16 Claims, 2 Drawing Sheets

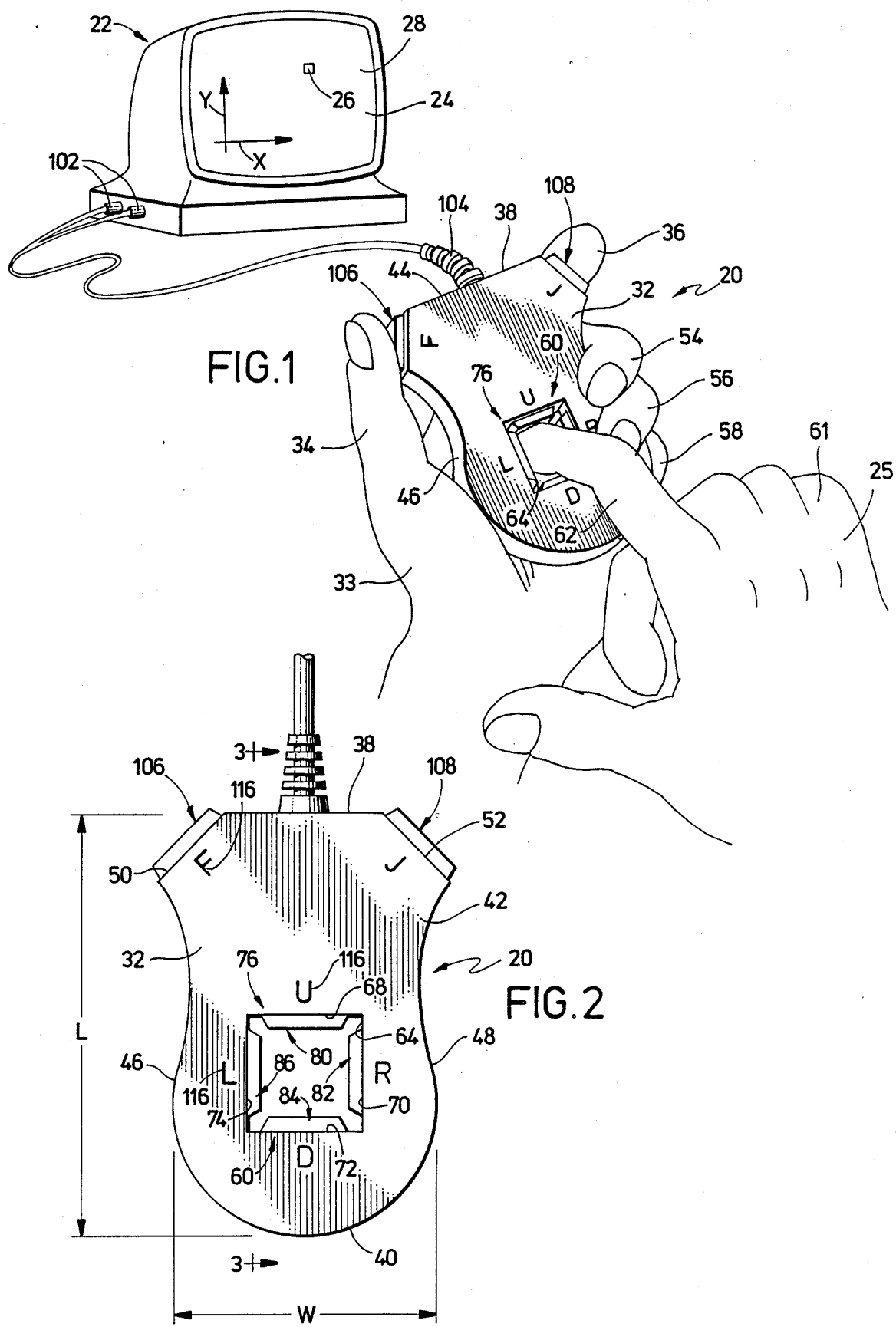

DIRECTIONAL CONTROL DEVICE

BACKGROUND OF THE INVENTION

This invention relates generally to manually-operable control devices and relates more particularly to such control devices for controlling directional input signals and the like in various apparatus.

The type of apparatus with which this invention is concerned includes apparatus wherein a directional characteristic attending the apparatus is capable of being controlled by the actuation of a switch. For example, in electrical apparatus having a video display screen, such as video displays in electronic amusement and instructional machines requiring positional or directional control of an image in two dimensions, control of the directional characteristic is effected by the actuation of a switch operatively interconnected within an electrical circuit associated with the display screen.

For controlling directional characteristics in apparatus of the aforedescribed type, directional controllers, popularly known as "joy sticks", can be used for controlling input signals responsible for the directional characteristics of an apparatus. Commonly, joy sticks include a body and multi-directional switch means associated with the body. By appropriately manipulating the switch means, a user can control the directional input signals within the apparatus. Examples of such control devices are shown and described in U.S. Pat. Nos. 4,445,011, 4,604,502, 4,687,200 and 4,739,128.

A limitation associated with joy sticks such as those described in the referenced patents relates to the methods by which the switch means of the joy sticks are used. Such methods may, for example, require a bending of the hand at the wrist, manipulation of a control knob, or controlled movement the user's fingers or thumb as the fingers or thumb are bent at appropriate joints. Commonly, such methods are difficult to carry out for long periods of time and tend to fatigue the user. Moreover, none of such methods of use are believed to facilitate a rapid actuation of the switch means due to the hand or finger motions required for switch actuation.

Accordingly, it is an object of the present invention to provide a new and improved control device for controlling directional input signals and the like in apparatus of the aforedescribed type which is easy to use and reduces the likelihood of user fatigue.

Another object of the present invention is to provide such a device having switches which can be actuated with relatively little effort on the part of the user and which facilitate prompt actuation.

Still another object of the present invention is to provide such a device including an additional switch which is responsible for an input signal, such as a "fire" or "jump" signal, independent of the directional input signals.

Yet another object of the present invention is to provide such a device which can be comfortably held within a hand of a user when used.

A still further object of the present invention is to provide such a device which is uncomplicated in construction and effective in operation.

SUMMARY OF THE INVENTION

This invention resides in a directional control device comprising a body having an opening for receiving the finger of a user and switch means associated with the opening including at least one switch which can be actuated by a depressing action. The switch is supported adjacent a side of the opening for actuation with the side of the user's finger when the finger is received by and moved toward the side of the opening.

BRIEF DESCRIPTION OF THE DRAWING FIGURES

FIG. 1 is a perspective view of an embodiment of a control device shown being utilized for controlling spatial variables in a video display device;

FIG. 2 is a frontal view of the FIG. 1 device as seen generally from above in FIG. 1;

DETAILED DESCRIPTION OF AN ILLUSTRATIVE EMBODIMENT

Figure 3:
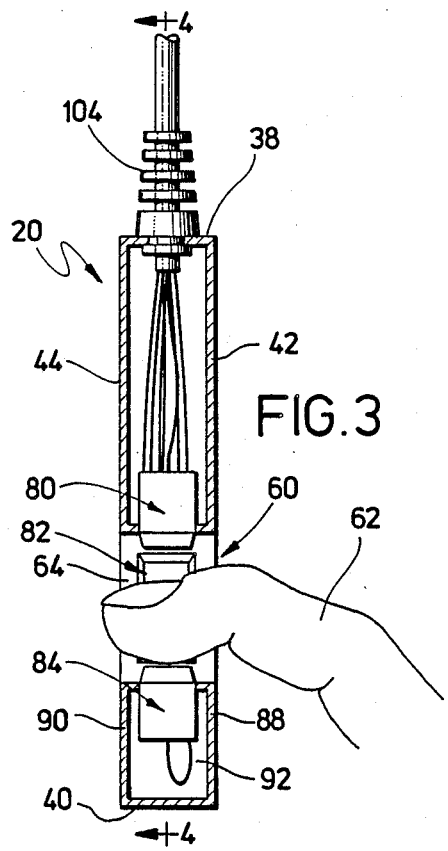
FIG. 3 is a cross-sectional view taken about on line 3—3 of FIG. 2 and illustrating the user's finger when positioned in a condition of use within the device.

Turning now to the drawings in greater detail, there is shown in FIG. 1 an embodiment 20 of a lightweight and durable control device shown utilized in an environment of intended use. Such an environment includes a video amusement apparatus 22 including a vertically-disposed display screen 24 intended to be viewed by a player 25 during the course of a game played with the apparatus 22. As will be apparent herein, the control device 20 provides means by which the spatial characteristics of an image character, indicated 26, displayed on the screen 24 can be controlled. More specifically, the control device 20 provides means by which movements of the character 26 can be controlled across the screen 24 along the indicated X and Y coordinate directions. For present purposes, the image character 26 is movable across the display screen 24 relative to a stationary background 28, but it will be understood that in comparable apparatus, the background can be moved vertically or horizontally relative to a stationary image character. Accordingly, the principles of the present invention can be variously applied.

With reference to FIGS. 1 and 2, the control device 20 includes means providing a body 32 adapted to be comfortably held within the palm of a player's hand 33 so that the center of the body 32 lies substantially centrally of the palm of the hand 33 and the thumb 34 and index finger 36 of the hand 33 are positionable adjacent opposite sides of the body 32 for manipulation of switches described herein. To this end, the body 32 is elongated in shape having two opposite ends 38, 40, a front face 42, a back face 44 and two opposite sides 46 and 48. As best viewed in FIG. 2, one end 40 is rounded so as to meet each side 46 or 48 along a rounded corner. The other end 38 is substantially flat and meets each adjacent side 46 or 48 along an oblique corner 50 or 52, respectively. Moreover, each side 46 or 48 is arcuate in shape so that when the body 32 is viewed frontally, as in the view of FIG. 2, the appearance of the body 32 resembles that of a guitar.

By way of example, the following dimensions of the body 32 are provided. The length L (FIG. 2) of the body 32 as measured between its ends 38, 40 is about 3.8 inches, the width W (FIG. 2) of the body 32 as measured between its sides 46, 48 is about 2.5 inches, and the thickness T (FIG. 3) of the body 32 as measured between its faces 42, 44 is about 0.7 inches. When the body 32 is operatively positioned within the hand 33 of the player 25 having hands of average adult size, the body 32 is substantially centered within the player's palm and grasped between the base of the thumb 34 and the ends of the fingers 54, 56 and 58. Meanwhile, the thumb 34 and index finger 36 are positionable adjacent the corresponding one of the oblique corners 50 or 52 for a purpose apparent herein.

In accordance with the present invention and with reference to FIGS. 1 and 2, the body 32 includes means defining an aperture or recess 60 for receiving the index finger 62 of the player's other hand 61 (i.e., the hand not used to hold the body 32) when the finger 62 is inserted endwise into the recess 60. In the depicted device 20, the recess 60 is in the form of a through-opening 64 extending through the front and back faces 42, 44 and located substantially centrally of the body 32 as viewed in FIG. 2. In addition, the opening 64 is substantially square in shape and includes four sides 68, 70, 72, 74. As best shown in FIG. 2, one side 68 of the opening 64 is parallel to the body end 38 and two other sides 70 and 74 are oriented substantially perpendicular to the end 38. An opening 64 found to be well-suited in size for operatively receiving the player's index finger 62 has sides 68, 70, 72, 74 which are each about 1.0 inches in length so that when the finger 62 is positioned within the center of the opening 64 as shown in FIG. 3, the sides of the finger 62 are spaced from the opening sides 68, 70, 72, 74 by a distance accommodating prompt movement of the finger 62 from one opening side to another opening side.

In accordance with the present invention, there is associated with the body opening 64 switch means 76 including four switches 80, 82, 84, 86 which are capable of being actuated with the sides of the player's index finger 62 so that the image character 26 (FIG. 1) can be moved across the FIG. 1 video screen 24 in a desired manner. Each switch 82, 84 or 86 is of a type capable of being actuated by the depressing action of a finger and, as exemplified by the switch 86 of FIG. 5, includes a body 85 and a lever member 87 extending from the body 85. The lever member 87 is capable of being moved with a finger relative to the body 85 from an extended condition as illustrated in solid lines in FIG. 5 to a depressed condition adjacent the body 85 for making or breaking the electrical contacts of the switch in accordance with the switch design. In addition, the lever member 87 is spring-biased from the depressed condition to the extended condition so that upon removal of the finger used to depress the lever member 87, the member 87 automatically returns to its extended condition.

Figure 4:
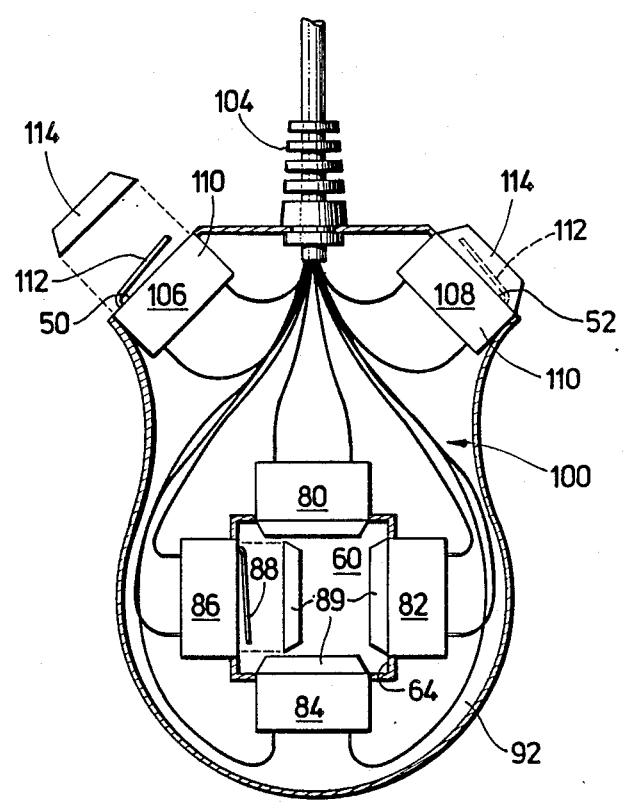
FIG. 4 is a cross-sectional view taken on line 4—4 of FIG. 3.
Figure 5:
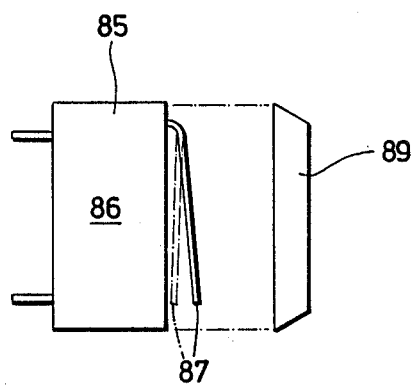
FIG. 5 is an exploded elevation view of a switch and boot cover of the FIG. 1 device.

In the depicted device 20 and with reference to FIG. 4, the switches 80, 82, 84, 86 are arranged about the opening 64 so that each switch is positioned adjacent a corresponding side 68, 70, 72 or 74 of the opening 64 and in such a relation to the body opening 64 so that the lever members 87 are accessible to the finger 62 inserted through the opening 64. To this end and as shown in FIG. 4, the lever members 87 protrude a short distance into the opening 64 and the switch bodies 85 are supported within the body 32 so that actuation of each switch 80, 82, 84 or 86 requires a sidewise depression of its lever member 87 in relation to the body opening 64. Thus, actuation of any of the switches 80, 82, 84, 86 is effected when the index finger 62 (FIG. 1) is operatively positioned through the opening 64 and appropriately shifted toward the corresponding opening side 68, 70, 72 or 74 so that the corresponding lever member 87 is depressed by a side of the finger 36. To facilitate user comfort when depressing the switch lever members 87 and as best shown in FIG. 5, a flexible rubber boot 89 is joined to each switch body 32 so as to cover each lever member 87.

In accordance with the present invention, the switches 80, 82, 84, 86 provide the player 25 (FIG. 1) with control of movement of the character image 26 in the indicated X and Y coordinate directions across the display screen 24. In this connection, switch 80 is wired to control the movement of the image 26 in the positive Y direction, switch 82 is wired to control the movement of the image 26 in the positive X direction, switch 84 is wired to control the movement of the image 26 in the negative Y direction, and switch 86 is wired to control the movement of the image 26 in the negative X direction. Hence, the player 25 can move the image 26 back or forth or up or down the screen 24 by simply moving his index finger 36 in the appropriate direction from the center of the opening 64 so that the appropriate switch 80 82, 84 or 86 is actuated by the side of the finger 36.

In common electrical apparatus with which a device in accordance with the present invention can be used, directional movements of a character image displayed upon a screen may be initiated by the making of appropriate electrical circuits responsible for the initiation of directional control signals. In other words, movement of a character image in the positive X-direction may be initiated by the making of a suitable electrical circuit operatively interconnected with the apparatus for controlling the movement of the image 26 in the positive X-direction. Accordingly, the switches utilized for making the appropriate electrical circuits in such common apparatus are normally open, but it will be understood that the design of a control device for use with other types of electrical apparatus whose directional input signals are initiated by breaking of appropriate circuits must take into account the switch and compatibility requirements of the apparatus with which the device is to be used.

For illustrative purposes, however, the depicted device 20 is constructed for compatibility with electronic game apparatus whose directional input signals are initiated by the making of appropriate electrical circuits. In such an apparatus, movement of the character image 26 in any of the positive Y-direction, positive X-direction, negative Y-direction and negative X-direction requires the making of an appropriate circuit. Accordingly and as indicated in the wiring diagram of FIG. 6, each of the switches 80, 82, 84 or 86 is a normally-open switch. An example of a switch found suitable for use as a switch 80, 82, 84 or 86 is available as a subminiature SPDT lever switch available under the trade designation ARCHER from Radio Shack, a division of Tandy Corp., Ft. Worth, Tex., Cat No. 275-016.

Figure 6:
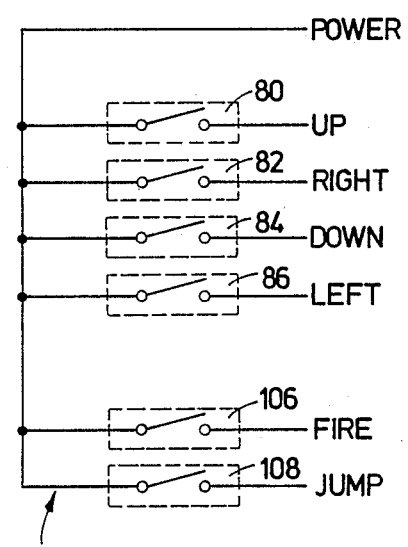
FIG. 6 is a wiring diagram of the FIG. 1 device.

The switches 80, 82, 84, 86 are wired within the device 20 with wiring 100 in accordance with the wiring schematic of FIG. 6. Accordingly, wiring 100 including a plurality of wires are connected to appropriate terminals of the switches 80, 82, 84, 86 so that actuation of the switches makes the appropriate electrical circuit for initiating a desired directional movement. As shown in FIG. 4, the wires extend from the device body 32 through the end 38 thereof and are operatively connected to jacks 102 (FIG. 1) or some other suitable adaptor for interconnection of the device 20 with the apparatus 22. The wiring 100 is insulated for safety, and a strain relief 104 is incorporated within the wiring insulation at the body end 38.

With reference again to FIGS. 1, 2 and 4, the switch means 76 of the device 20 also includes a pair of switches 106, 108 associated with the oblique corners 50, 52 of the device body 32 permitting two non-directional signals associated with the image 26 (FIG. 1) to be controlled by the player 25. Such a non-directional signal may, for example, initiate a "fire" or "jump" command so that the character image 26 either fires a projectile toward a target or moves suddenly in the positive Y-direction and returns to a position of origin. In the apparatus 22, each of the two non-directional signals is initiated by the making of an appropriate electrical circuit and as shown in FIG. 6, the switches 106, 108 are wired within the device 20 for making the appropriate electrical circuit within the apparatus 20 when either of the two non-directional signals associated with the image 26 is desired to be initiated.

Like the switches 80, 82, 84 and 86, each of the switches 106 or 108 are actuated by a depressing action with a finger. In this connection and as shown in FIG. 4, each switch 106 or 108 includes a body 110 and a lever member 112 attached to the body 110 for movement between extended and depressed conditions and wherein the lever member 112 is spring-biased to an extended condition. For use with the apparatus 22 which requires the making of a circuit to initiate a non-directional signal, the switches 106, 108 of the device 20 are normally-open and, as shown in FIG. 6, are wired so that depression of the lever member 112 of switch 106 initiates one non-directional signal (e.g., a "fire" signal) and so that depression of the lever member 112 of switch 108 initiates another non-directional signal (e.g., a "jump" signal). The aforementioned subminiature SPDT lever switch from Radio Shack has been found to be well-suited for use as the switch 106 or 108. If desired, an optional rubber boot 114 (FIG. 4) can be positioned across each lever member 112.

An advantage provided by the switches 106, 108 relates to the disposition of the lever members 112 in relation to the thumb 34 and index finger 36 when the device body 32 is operatively held by the player's hand 33. In this connection and as shown in FIG. 4, each lever member 112 protrudes a short distance from the surface of a corresponding corner 50, 52 of the body 32, and as mentioned earlier, each of the thumb 34 and index finger 36 are positioned adjacent a corresponding corner 50 or 52 when the device body 32 is held in the player's hand 33 in the manner illustrated in FIG. 1. Hence, each switch lever member 112 is readily accessible to a corresponding one of the player's thumb 34 and the index finger 36 for actuation of the corresponding switch 106 or 108. In addition, the disposition of the two switches 106, 108 at the body corners 50, 52 accommodates use of the device body 32 by a right or left-handed player who may hold the body 32 in either of his right hand or left hand for use.

Preferably, each switch 80, 82, 84, 86, 106 or 108 emits an audible sound, such as a "click", when actuated. Therefore, the player 25 is provided with a positive signal that the contacts of the switch being depressed are "made" and that finger-applied pressure to the switch can be relieved. Thus, as soon as the player 25 hears the audible sound, any doubt that the player 25 may entertain that a switch is depressed far enough to actuate the switch is erased, and such sound-emitting switches are advantageous in this respect. The aforementioned subminiature SPDT level switch from Radio Shack is an example of a switch providing an audible "click" when the switch contacts are closed.

Although the switches 80, 82, 84, 86, 106, 108 can be supported within the device body 32 by any of a number of suitable means, the depicted body 32 includes a pair of outer rigid layers 88, 90 (FIG. 3) between which the switches 80, 82, 84, 86, 106, 108 are sandwiched. Moreover, the switch bodies 86, as well as the associated wiring 100 described herein, are encased within an intermediate layer 92 of suitable material, such as a silicone, epoxy or resin material, which holds the switch bodies 86 in a fixed relationship with respect to the device body 32 and opening 64. If desired, screws can be used to hold the outer and intermediate layers 88, 90, 92 together. Collectively, the layers 88, 90, 92 contribute to the relative lightness in weight and durability of the device 20.

For identifying the function of each switch 80, 82, 84, 86, 106 or 108 to the player, appropriate identifying indicia 116 are borne by the front face 42 of the body 32, as best shown in FIG. 2. Indicia symbols "U", "R", "D", and "L" stand for "up", "right", "down" and "left", respectively, and denote the direction in which the image 26 moves across the screen 24 when the corresponding switch 80, 82, 84 or 86 is depressed. Similarly, indicia symbols "F" and "J" stand for "fire" and "jump", respectively, and denote the action attending the image 26 when the corresponding switch 106 or 108 is depressed.

When operating the control device 20 and with reference again to FIG. 1, the player 25 holds the device body 32 in his hand 33 and positions the index finger 62 of his other hand 61 through the body opening 64. The thumb 34 and index finger 36 of the hand 33 are thus positionable in the FIG. 1 positions to promptly actuate the non-directional control switches 106, 108, and the index finger 62 of the hand 61 is in position to promptly actuate any of the directional control switches 80, 82, 84, 86 by simply moving the side of the finger 62 toward the appropriate switch 80, 82, 84, 86. To effect the switch-activating movement of the index finger 62, the hand 61 and finger 62 can be gently flicked at the wrist and knuckle from side to side (to actuate switches 82 and 86) and fore and aft (to actuate switches 80 and 84).

It has been found that with the player's thumb 34 and fingers 36, 62 positioned in relation to the switches 106, 108, 80, 82, 84, 86 as aforedescribed, any of the switches can be actuated rapidly and with little effort on the part of the player. Thus, the device 20 is easy to use and reduces the likelihood of user fatigue and hand cramps when the device 20 is used over a long period of time. In addition, due to the ease and promptness with which the switches of the device 20 can be actuated in comparison to switch means of conventional control devices, the level of play of a player generally improves with the device 20.

It will be understood that numerous modifications and substitutions can be had to the aforedescribed embodiment 20 without departing from the spirit of the invention. For example, although the body 32 has been shown and described as a hand-held unit, the body of a device in accordance with the broader aspects of this invention can be a table-mounted unit. In addition, although the non-directional control switches 106, 108 have been shown and described for controlling two non-directional control signals, the switches 106, 108 may be wired in parallel for controlling the initiation of a single input signal. With the switches 106, 108 wired in such a manner, the single input signal could be controlled by depression of either switch 106 or 108.

Furthermore, although the device 20 has been shown and described for use with an electrical apparatus 22, a device in accordance with the broader aspects of the present invention may be used for controlling directional movements in electro/mechanical apparatus, such as the forklift of a forklift truck, and automobiles controlled by remote control or automobile mirrors and the like whose positional adjustment is dependent upon actuation of switches incorporated within an electrical circuit. Accordingly, the aforedescribed embodiment 20 is intended for the purpose of illustration and not as limitation.

What is claimed is:

1. A directional control device comprising:
   a body having a recess for loosely receiving the finger of a user inserted endwise therein, said recess including sides which collectively provide an opening through which the user's finger can be operatively inserted and which opening accommodates the insertion of substantially the entire length of the user's finger; and
   switch means associated with said sides including at least one directional switch which can be actuated by a depressing action, said directional switch being supported adjacent a side of said opening and adjacent the entrance to said opening for actuation with the user's finger so that by inserting his finger through the opening, the user is permitted to actuate the switch with substantially any part of his finger remote of the fingertip, and
   the smallest distance as measured across the opening is at least about one inch so that when the user's finger is centered within the opening, the finger is spaced from the sides of the recess.

2. The device as defined in claim 1 wherein said switch means includes a plurality of switches which can each be actuated by a depressing action, each of said switches being supported by said body and mounted in such a relationship adjacent a corresponding side of said opening so that each of said switches can be actuated with a side of the user's finger when the user's finger is received by and moved toward a corresponding side of said opening.

3. The device as defined in claim 1 wherein each of said switches associated with said opening controls one of a number of directional signals.

4. The device as defined in claim 1 wherein said switch means include four switches associated with said opening wherein each switch corresponds with one of four directional signals corresponding to coordinate directions in an X-Y plane, and said switches are regularly spaced about the center of said opening.

5. The device as defined in claim 4 wherein said opening is substantially square in cross-section and each of the four switches is supported adjacent a corresponding side of said opening.

6. The device of claim 1 wherein said opening is adapted to receive the finger of one hand of the user and said body is adapted to be held within the other hand of the user so that said one switch can be actuated by the finger of the one hand as the body is held within the other hand.

7. The device of claim 6 wherein said body is shaped so as to provide a portion located adjacent one of the thumb and index finger of the other hand when said body is operatively held within the other hand, said switch means includes another switch which can be actuated by a depressing action and said another switch is associated with said body portion so that when said body is operatively held within the other hand of the user, said another switch can be actuated by one of the thumb or index finger of the other hand as the one thumb or index finger of the other hand is urged toward said body portion.

8. The device as defined in claim 6 wherein said body is shaped so as to provide one portion located adjacent the thumb of the other hand and another portion located adjacent the index finger of the other hand when said body is operatively held within the other hand, said switch means includes first and second switches which can each be actuated by a depressing action, each of said first and second switches being associated with a corresponding one of said one and another body portions so that when said body is operatively held within the other hand of the user, each of said first and second switches can be actuated by a corresponding one of the thumb and index fingers of the other hand.

9. The device of claim 1 wherein said one directional switch is adapted to emit an audible signal when actuated.

10. A multi-directional control device comprising:
    a body having a recess for loosely receiving the finger of a user inserted endwise therein, said recess including sides which collectively provide an opening through which the user's finger can be operatively inserted and which opening accommodates the endwise insertion of substantially the entire length of the user's finger; and
    switch means associated with the opening including a plurality of directional switches which can each be actuated by a depressing action, each of said switches being supported by said body adjacent a corresponding side of said opening and adjacent the entrance to said opening for actuation with the user's finger so that by inserting his finger through the opening, the user is permitted to actuate the switches with substantially any part of his finger remote of the fingertip, and
    the smallest distance as measured across the opening is at least about one inch so that when the user's finger is centered within the opening, the finger is spaced from the sides of the recess.

11. The device as defined in claim 10 wherein each of said switches corresponds with one of a number of directions in a two-dimensional plane.

12. The device as defined in claim 10 wherein said switch means include four switches associated with said opening wherein each switch corresponds with one of four directional signals corresponding to coordinate directions in an X-Y plane, and said switches are regularly spaced about the center of said opening.

13. The device as defined in claim 12 wherein said opening is substantially square in cross-section and each of the four switches is supported adjacent a corresponding side of said opening.

14. The device of claim 10 wherein said opening is adapted to receive the finger of one hand of the user and said body is adapted to be held within the other hand of the user so that said one switch can be actuated by the finger of the one hand as the body is held within the other hand.

15. The device of claim 14 wherein said body is shaped so as to provide a portion located adjacent one of the thumb and index finger of the other hand when said body is operatively held within the other hand, said switch means includes another switch which can be actuated by a depressing action and said another switch is associated with said body portion so that when said body is operatively held within the other hand of the user, said another switch can be actuated by one of the thumb or index finger of the other hand as the one thumb or index finger of the other hand is urged toward said body portion.

16. The device as defined in claim 14 wherein said body is shaped so as to provide one portion located adjacent the thumb of the other hand and another portion located adjacent the index finger of the other hand when said body is operatively held within the other hand, said switch means includes first and second switches which can each be actuated by a depressing action, each of said first and second switches being associated with a corresponding one of said one and another body portions so that when said body is operatively held within the other hand of the user, each of said first and second switches can be actuated by a corresponding one of the thumb and index fingers of the other hand.

* * * * *